July 23, 1957　　　　D. H. PUTNEY　　　　2,800,307
APPARATUS FOR CONTROLLING TEMPERATURE CHANGE OF BLENDS
OF FLUIDS OR FLUIDS AND FINELY DIVIDED SOLIDS
Filed June 4, 1954　　　　　　　　　　　2 Sheets-Sheet 1

INVENTOR.
David H. Putney
BY
ATTORNEY.

INVENTOR.
David H. Putney
BY
ATTORNEY.

United States Patent Office 2,800,307
Patented July 23, 1957

2,800,307

APPARATUS FOR CONTROLLING TEMPERATURE CHANGE OF BLENDS OF FLUIDS OR FLUIDS AND FINELY DIVIDED SOLIDS

David H. Putney, Fairway, Kans., assignor to Stratford Engineering Corporation, Kansas City, Mo., a corporation of Delaware Application June 4, 1954, Serial No. 434,638

6 Claims. (Cl. 257—73)

This invention relates to improvements in a method and apparatus of reducing the temperature change where fluids are blended or where finely divided solids are blended with fluids, and refers more particularly to the establishment of a cyclic flowing stream of the blended fluids or fluids and solids, and the introduction of the components in a manner and at a feed rate which will not seriously disturb or affect the temperature of the flowing stream previously established.

Many manufacturing procedures, chemical processes and blending problems involve the addition of a gas, liquid, or a pulverized solid to a liquid or slurry while maintaining the total blend at a constant or nearly constant temperature. Frequently these gas, liquid or solid additions are at temperatures above or below the temperature at which the blend should be maintained. Moreover, the addition materials or components being added are sometimes chemically reactive with the blend or with each other so that endothermic or exothermic heat of reaction must be added or removed if correct temperatures are maintained.

The conventional method of handling such materials has heretofore been to bring them together into a common line either with or without some mixing device installed therein, and then immediately pass the resulting blend into a heat exchanger where heat is either added or removed as required to give the desired temperature of the blend at the heat exchanger outlet. By this method it is, of course, possible to accurately control the temperature of the blend at the point of exit from the exchanger or at any other single point in its passage through the exchanger, but not at all points in the exchanger. Following the addition of one or more of the fluids or pulverized solids to another, there may be a sudden temperature change occasioned by the actual temperatures of the components or by a chemical heat of reaction. This temperature change occurs either before the blend contacts the heat exchange elements or during the passage of the blend over the elements. There is therefore a temperature gradient established in the blend as it passes through the heat exchanger and its temperature is, therefore, not constant. In some processes the product is quite sensitive to temperature at which it is formed from its component parts, and the characteristics of the product are influenced by the temperature maintained in the blend from the instant the various components are brought together.

It is, therefore, an object of this invention to provide a method and apparatus for maintaining a substantially constant temperature in a fluid or mixture of fluids passing through a heat exchanger even though large quantities of heat are removed from or added to said fluid mixture.

Another object of the invention is to provide a method and apparatus for eliminating to a great extent the temperature gradient from a system wherein chemically reactive fluids or fluid and solids are brought together.

A further object of the invention is to provide a method and apparatus for dissipating the sensible or exothermic reaction heat of fluids being blended in a large cyclic flowing stream of the blend and simultaneously removing an equivalent amount of heat from the blend by indirect heat exchange.

A still further object of the invention is to provide a method and apparatus for adding sensible heat or endothermic reaction heat to a blend of fluids by establishing a large cyclic flow in such blend, adding a required amount of heat to said cyclic stream and then adding the fluid components of the blend to the cyclic stream.

In the accompanying drawings which form a part of the specification and are to be read in conjunction therewith, there are shown different types of apparatus which may be effectively used to practice the process.

Figure 1:
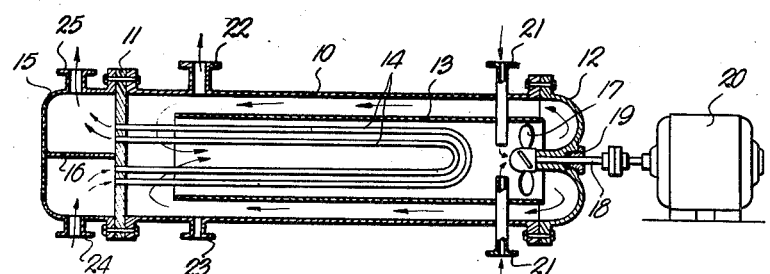
Fig. 1 is a side view partly in section showing one embodiment of the invention.

Referring to Fig. 1, the tubular heat exchanger there shown comprises an outer shell 10 closed at one end by a tube sheet 11 and at the other end by a hydraulic pumping head 12. Within the outer shell 10 is a circulating tube 13 open at both ends for free communication with the space within the outer shell. Heating or cooling elements 14 in the form of U-bends made of tubing are rolled into or otherwise attached to the tube sheet 11. These elements extend through the open end of the circulating tube 13 and occupy an appreciable portion of the space enclosed by the circulating tube. A typical heat exchange channel or cover 15 equipped with a central partition or baffle 16 is provided within the channel for distribution of heating or cooling medium to the transfer elements 14. A pumping impeller 17 is located in the open end of the circulating tube 13 at the end opposite the tube sheet. This impeller is mounted on a shaft 18 rotating in a bearing in the pumping head 12 and sealed by a packed gland 19. The impeller is driven by any suitable prime mover such as a driving motor, turbine or engine, shown diagrammatically at 20.

Inlet nozzles 21 are provided for feeding components of the blend or mixture to the apparatus. These nozzles extend through the outer shell and inner circulating tube to discharge the components on the upstream side of impeller 17. The impeller is arranged for taking suction from the circulating tube 13 and discharging into the hydraulic head 12, where the flow of fluids is reversed and directed into the annular space between the outer shell and circulating tube. Nozzle 22 is provided in the outer shell for withdrawing the finished blend of components. A separate nozzle 23 on the underside of the outer shell serves as a drain for emptying the machine. Channel 15 is provided with an inlet connection 24 and an outlet connection 25 for the heating or cooling medium, whichever is being used.

Figure 2:
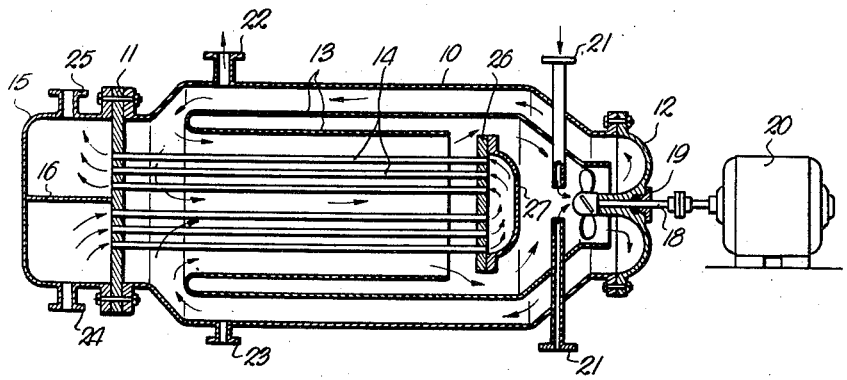
Fig. 2 shows a modified embodiment with the heat exchanger in section.

The essential difference between the apparatus shown in Figs. 1 and 2 is that the tube bundle or heat exchange elements 14 in Fig. 1 are in the form of continuous U-bends, whereas in Fig. 2 they are in the form of straight tubes which require that an additional tube sheet 26 and a floating head 27 be provided. In the apparatus shown in Fig. 2 the circulating tube 13 is doubled back and contoured to provide for flow of the cyclic stream around the tubes 14 and about the floating head 26, in the manner indicated by the arrows.

Figure 3:
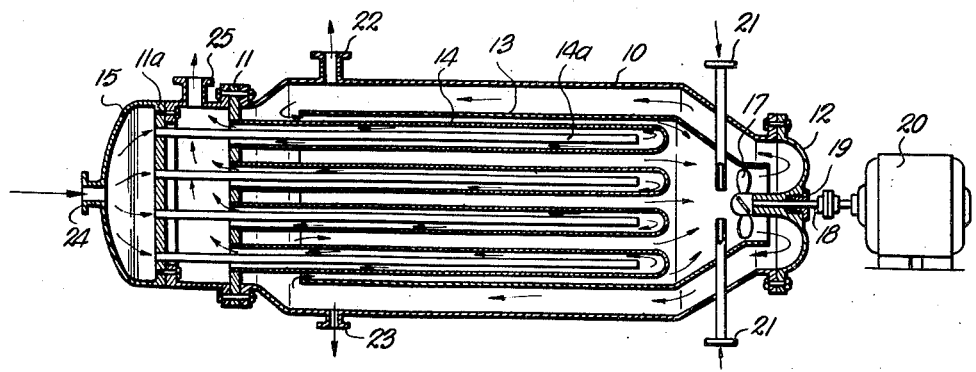
Fig. 3 is a second modification also showing the heat exchanger in section.

Fig. 3 shows a second modified form of exchanger, the difference residing primarily in the type of heat exchange tubes which are used. In this case the so-called lance-type tube bundle is employed. The heat exchange tubes 14 are closed at the end opposite the tube sheet 11. An additional tube sheet 11a is provided within channel 15, and into the tube sheet 11a are fixed open ended tubes 14a. Tubes 14a are equal in number and spacing to the heat exchange tubes 14 but are smaller in diameter. These open ended tubes 14a are arranged to extend into the closed end tubes 14 terminating a short distance from the closed ends. The function of tubes 14a is to conduct heat or cooling medium to the ends of closed end tubes 14, discharge it into the closed end tubes so it will flow back through the annular space between the closed and open end tubes. In this type of apparatus, as in those previously explained, the impeller 17 picks up the components introduced through nozzles 21 and causes them to circulate as blend through the annular space between the outer shell 10 and circulating tube 13. At the tube sheet end of the exchangers the travel of the flowing stream is reversed and the blend or mixture caused to pass through the interior of the circulating tube at the same time being brought in heat exchange relationship with the heat exchange elements 14.

In the modified types shown in Figs. 2 and 3 similarly to the construction of Fig. 1, a portion of the blend is removed through nozzle 22 and a drain is provided by the nozzle 23.

In Fig. 2 the heating medium or coolant is supplied through nozzle 24 and discharged through nozzle 25 while in Fig. 3 the heat exchange medium is introduced through nozzle 24 at the end of the channel and after circulating through the lance-type tubes is discharged through nozzle 25 located intermediate the tube sheets 11 and 11a.

It will be understood that suitable connections are made to nozzles 24 and 25, and valves are provided to control the circulation of the heat exchange medium to the apparatus in desired quantities and at a proper circulating rate. Also, the temperature of the medium is governed according to the requirements of the particular fluid which is being tempered. Pipe connections are made to nozzles 21 and in turn are connected to suitable sources of supply for introducing the components undergoing treatment in the apparatus. A discharge pipe is in each case connected to nozzle 22 equipped with suitable valves and a discharge pipe to nozzle 23, also equipped with valves to drain off the fluids when desired.

Obviously other forms of heat exchange apparatus may be used without altering the concept hereinbefore explained. For example, heat exchange elements can be installed in the annular space between the circulating tube and the outer shell of the exchanger. Also, the heat exchange elements can be in the form of pipe coils, thus eliminating the tube sheet and channel construction, or the outer shell may be jacketed for the circulation of heating or cooling medium between the jacket and outer shell to supplement or replace the tubular or coil elements shown. The circulating tube may likewise be jacketed to give a double wall construction for the circulation of heat transfer fluid therebetween, thus providing a heat exchange medium within the body of the circulating stream.

It is also contemplated that the direction of flow of the liquids may be reversed either by changing the pitch of the impeller or its direction of rotation. In other words, the invention contemplates any arrangement of heat exchange surface in a double shell vessel together with pumping means for establishing a closed cycle internal flow over that surface greater than the flow of fluids into or out of the exchanger.

As an example of the utility of the invention, consider first the problem of bringing together into heat exchange apparatus continuous streams of isobutane, butene and hydrofluoric acid and maintaining the resulting blend at a relatively constant temperature. When these constituents are brought together, a reaction takes place which converts the butenes and some of the isobutane to alkylate (isooctane). The reaction involves the release of a considerable quantity of heat which in many cases is removed in a heat exchanger not equipped with machanical means for establishing cyclic flow therein. At the point where the constituents blend and before they pass over the exchange surface, the exothermic heat released raises the temperature of the mixture and this rise in temperature results in pressing the reaction in the direction of polymerization of butenes at the expense of isooctane production, which is undesirable. If, while this reaction is taking place, the content of the heat exchanger is rapidly circulated over the exchanger surface in a closed cyclic flow, and the feed components are added to this cyclic stream in accordance with the method wherein contemplated, the temperature rise resulting from the heat of reaction can be reduced to any practical figure desired, depending upon the amount of cyclic flow established.

As an example of the desirable effects which may be obtained, consider the case where 20 G. P. M. of butylene, 130 G. P. M. of isobutane, and 150 G. P. M. hydrofluoric acid (88% strength) all at a temperature of 60° F. are fed into a heat exchanger, and the temperature of the mixture controlled to maintain the resultant blend at a relatively constant temperature of 60° F. Under the conditions specified the exothermic heat of reaction amounts to 62,500 B. t. u. per minute, and this heat is so rapidly released at the point where the feed streams meet at the entrance to the exchanger that if the exchanger is of conventional type not equipped with internal cyclic flow, the temperature of the mix almost immediately rises to 98.5° F. This increased temperature tends to reduce the yield of isooctane produced and instead produces a complex mixture of undesirable polymers.

Figure 4:
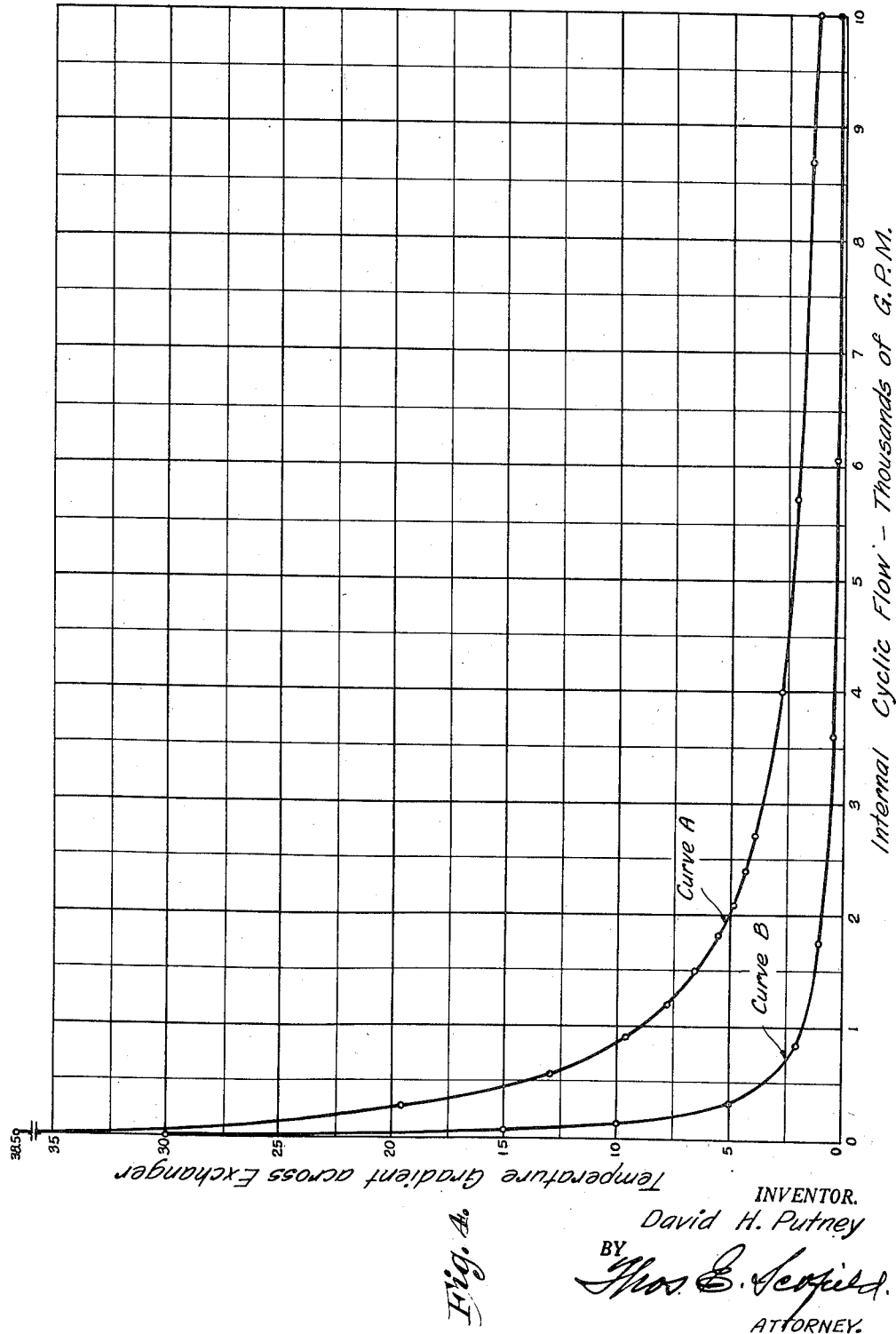
Fig. 4 is a graph in which the temperature gradient across the heat exchanger is charted against the internal cyclic flow of the circulating stream in gallons per minute as applied to the examples hereinafter described.

Under conditions comparable to those just named, consider now the mixture of the same streams of components introduced into a heat exchanger of the type herein disclosed. The feed streams enter the apparatus and combine with a flowing cyclic stream which is many times their individual and combined flowing rate. For example, if the cyclic stream established by the pumping impeller in any of the apparatuses shown is 600 G. P. M., the maximum temperature which can occur is 72.8° F. If the cyclic stream is 1500 G. P. M. then the maximum temperature can be only 66.4° F. If the cyclic stream is 12,000 G. P. M. the maximum temperature will be under 61° F., less than 1° F. rise. The effect of cyclic flow rate on the temperature gradient is graphically shown by curve A of Fig. 4.

In all cases above prescribed, the heat exchange elements are removing the same quantity of heat, that is, 62,500 B. t. u. per minute. The larger the flow rate of the cyclic stream, the lower is the temperature range through which it must be cooled to remove the same amount of heat.

As a further example of the utility and novelty of the instant method, consider the case where 60 G. P. M. of hydrocarbon distillate are being passed through a heat exchanger, together with 1 G. P. M. of 98% sulfuric acid and it is advantageous to remove the heat of reaction resulting from the treatment of oil by the acid. If the streams of acid and oil are brought together and passed through a conventional heat exchanger or are brought together within the heat exchanger without recirculation, there results an immediate temperature rise of 30° F. and a temperature gradient across the exchanger. The heat absorbed in the exchanger amounts to approximately 6,900 B. t. u. per minute if the mixture is to be restored to its original feed temperature. If, however, the principle of the instant invention is utilized and circulation within the exchanger is established, then the same amount of heat can be removed while limiting the initial temperature rise in accordance with internal cyclic flow rates as follows:

| Feed Acid, G. P. M. | HC Feed, G. P. M. | Internal Cyclic Flow, G. P. M. | Maximum Temp. Rise, °F. |
|---|---|---|---|
| 1 | 60 | 0 | 30 |
| 1 | 60 | 61 | 15 |
| 1 | 60 | 122 | 10 |
| 1 | 60 | 305 | 5 |
| 1 | 60 | 854 | 2 |
| 1 | 60 | 1,769 | 1 |
| 1 | 60 | 3,599 | 0.5 |

From the table, the effect of cyclic flow rate upon temperature rise is simply explained as follows: When there is no cyclic flow established, then the 6,900 B. t. u. per minute is taken up by only the feed streams which total 61 G. P. M. and the resulting temperature rise is 30° F., if an internal cyclic flow of 61 G. P. M. is established and this cyclic flow is passed over exchange surface to cool it back to the 60° F. feed temperature, then when the feed streams are introduced into the cyclic stream the 6,900 B. t. u. per minute of exothermic reaction heat is dissipated into a total stream consisting of 61 G. P. M. feed and 61 G. P. M. of cyclic flow, so that the temperature rise is only half as much as if no cyclic flow were present. If the cyclic stream is established at a rate of 29 times the feed rate, then the temperature rise can be only one-thirtieth of the rise with no cyclic flow, or in this case only 1° F. Likewise in this example, the effect of cyclic flow rate upon temperature gradient is graphically shown by curve B in Fig. 4. Since in many processes it is highly desirable for various reasons to maintain temperatures as nearly constant as possible, the advantages of establishing a cyclic flow within a heat exchanger are numerous and manifest.

A formula developed from thermodynamical calculations based upon the invention and confirmed by practical tests reveal with arithmetical clarity the resultant effects obtained by varying the factors involved.

$$TG_c = \frac{TG_o \times \text{Feed Rate}}{\text{Feed Rate} + \text{Cyclic Flow Rate}}$$

where $TG_c$ = The temperature gradient developed within the cyclic flow exchanger in degrees Fahrenheit.
$TG_o$ = The temperature gradient developed with no cyclic flow in degrees Fahrenheit.
The feed rates and cyclic flow rates both being computed in gallons per minute.

From the foregoing it will be seen that the invention is well adapted to attain all of the ends and objects hereinbefore set forth, together with other advantages which are inherent to the method. High internal recirculation within the exchanger makes for high velocity over the exchange surface and high heat transfer rates. Moreover, the heat transfer rate can be maintained independently of the throughput rate since velocity over the tubes is a function of the internal circulation rather than feed rate. These benefits are inherent in the type of apparatus disclosed, but are secondary to the main purpose and objects of the method hereinbefore described.

It will be understood that certain features and subcombinations are of utility and may be employed without reference to other features and subcombinations. This is contemplated by and is within the scope of the claims.

A many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for reducing the temperature change of a blend of fluids or fluids and finely divided solids including, in combination, an elongate casing having a discharge opening, a hollow open-ended circulating tube positioned axially within said casing and spaced from the interior wall thereof forming an annular passage therewith, an impeller at one end of the circulating tube for creating a cyclic flow of fluids through said tube and in the annular space surrounding said tube, a circulating head forming the end of the casing adjacent the impeller, a header at the other end of the casing, a plurality of relatively small diameter heat exchange tubes connected into said header, all of said tubes extending axially of said casing into said circulating tube, whereby heat exchange between the fluids circulating and the cyclic stream through and about the circulating tube and heat exchange medium passing through said heat exchange tubes is isolating within the circulating tube, and at least two fluid input lines penetrating the casing and the circulating tube with their discharge ends between the terminus of the heat exchange tubes adjacent the impeller and the impeller whereby to discharge input fluids therebetween.

2. Apparatus as in claim 1 wherein said casing is horizontally positioned.

3. Apparatus as in claim 1 wherein said fluid input lines are aligned opposite one another whereby to discharge the fluids input into the casing and circulating tube at the same distance from the impeller and terminus of the heat exchange tubes.

4. An apparatus as in claim 1 wherein the heat exchange tubes comprise double-back tubular elements connected into the header on opposite sides of a partition, an inlet for the heat exchange medium into one side of said header and an outlet from the other.

5. An apparatus as in claim 1 wherein the heat exchange tubes are connected into a partitioned header at one end of the casing and a floating header beyond the opposite end of the circulating tube, an inlet for the heat exchange medium in said header on one side of the partition and an outlet from the opposite side.

6. An apparatus as in claim 1 wherein the heat exchange tubes comprise concentric tubes of different diameters forming annular spaces therebetween, the tubes of larger diameter are closed at one end and connected at their open end into a header at one end of the casing, the smaller tubes open ended at both ends, one end of said small tubes connected to a separate header in the casing outboard of said first named header and extending substantially through the length of said larger tubes, an inlet for the heat exchange medium in the small tube header, and an outlet for the heat exchange medium from the large tube header.

References Cited in the file of this patent

UNITED STATES PATENTS

| | | |
|---|---|---|
| 1,397,282 | Hanley et al. | Nov. 15, 1921 |
| 1,770,320 | Morterud | July 8, 1930 |
| 1,877,322 | Hulse | Sept. 13, 1932 |
| 1,928,085 | Wyndham et al. | Sept. 26, 1933 |
| 2,443,817 | Draeger et al. | June 22, 1948 |
| 2,507,105 | Howard et al. | May 9, 1950 |
| 2,577,856 | Nelson | Dec. 11, 1951 |
| 2,596,975 | Bannon | May 20, 1952 |